United States Patent [19]

Krauth

[11] Patent Number: 4,727,260
[45] Date of Patent: Feb. 23, 1988

[54] PHOTOELECTRIC SCANNER WITH LIGHT-REFLECTOR OR LIGHT BARRIER

[75] Inventor: Wolfgang Krauth, Friedberg, Fed. Rep. of Germany

[73] Assignee: Erhardt & Leimer GmbH, Augsburg, Fed. Rep. of Germany

[21] Appl. No.: 844,467

[22] Filed: Mar. 26, 1986

[30] Foreign Application Priority Data

Mar. 29, 1985 [DE] Fed. Rep. of Germany ....... 3511474

[51] Int. Cl.⁴ .......................................... B65H 23/032
[52] U.S. Cl. ...................................... 250/571; 250/561
[58] Field of Search ........................ 250/548, 559–562, 250/571, 572; 356/429, 430

[56] References Cited

U.S. PATENT DOCUMENTS 3,461,302  8/1969  Benson et al. ....................... 250/548
4,222,064  9/1980  Lodzinski ............................. 356/429
4,641,070  2/1987  Pfizenmaier et al. ................ 250/561

Primary Examiner—Edward P. Westin
Assistant Examiner—Charles Wieland
Attorney, Agent, or Firm—Karl F. Ross; Herbert Dubno

[57] ABSTRACT

A photo-electric scanning device 1, with tubular housings 2, 3 with light source 15 and receiving element 16 and 17, respectively, arranged transversely and enclosing a web between them. The receiving element 17 cooperates with the light source 15 either according to the reflection principle or the light barrier principle. For light source 15 two receiving elements 16, 17 are provided which are capable of being actuated, of which either the first 16 cooperates with the light source 15 according to the reflection principle or the second 17 according to the light barrier principle. The first receiver 16 is closer to the light source 15 than the second receiving element 17. In this manner, operation is continuous with both receiving elements 16, 17.

8 Claims, 5 Drawing Figures

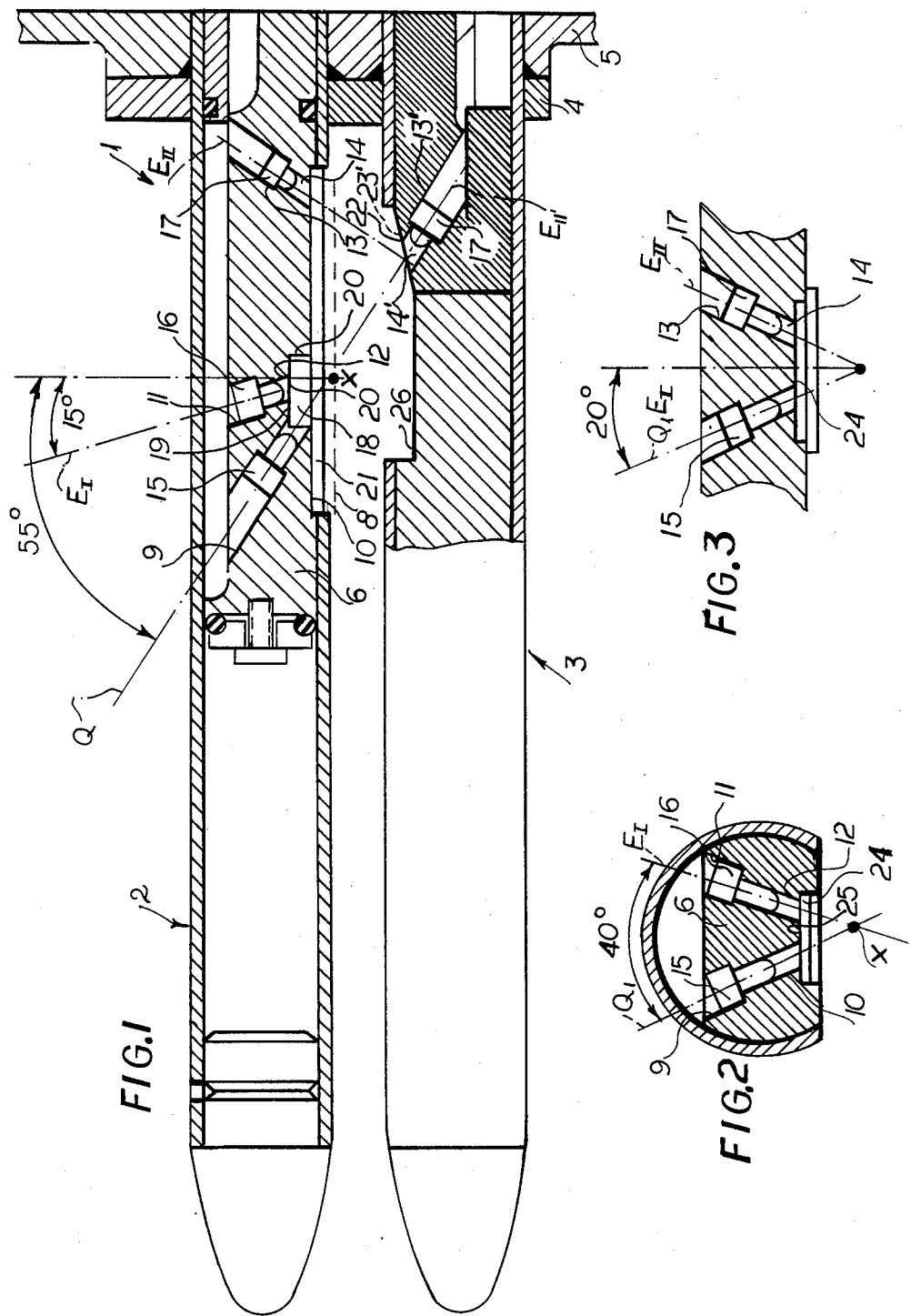

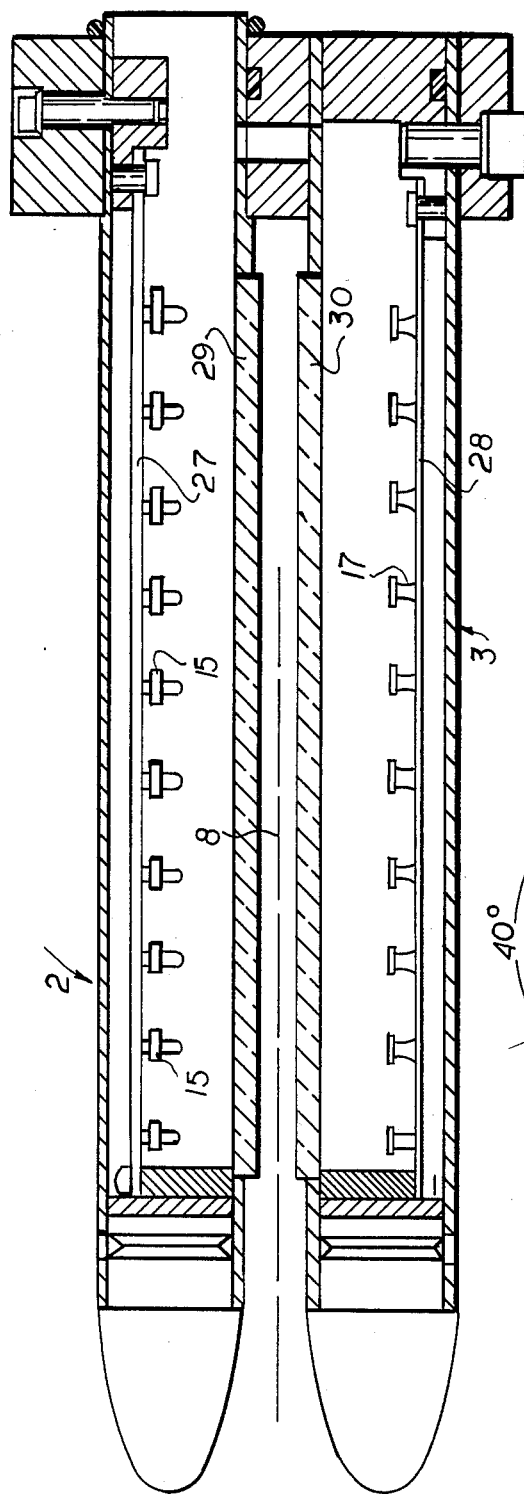
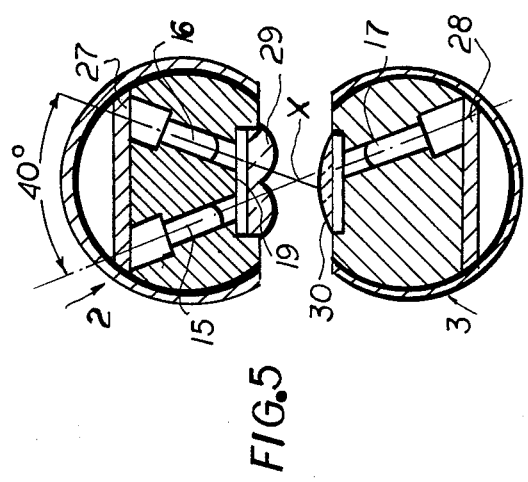
FIG. 4
FIG. 5

4,727,260

PHOTOELECTRIC SCANNER WITH LIGHT-REFLECTOR OR LIGHT BARRIER

FIELD OF THE INVENTION

The invention concerns a photo-electric scanning device for the edge area of a moving web, in particular a textile web, with a first tubular housing reaching transversely above the web, and a second tubular housing transversely thereunder, of which either the first has a light source and a receiving element and the second, as required, a reflecting surface for the light emanating from the light source, or of which the first tubular housing contains the light source and the second tubular housing the receiving element, and where the light source cooperates with the receiving element according to the light barrier principle or the reflection principle.

BACKGROUND OF THE INVENTION

In practice, scanning devices for the scanning of web edges and for determination of edge position operate either according to the reflection principle or the light barrier principle. Thereby extensive adjustment procedures are necessary when one wants to switch from one principle to the other principle. In fact, in using the reflection principle, only webs can be run whose surface is capable of reflecting the light of the light source. If the web has a net or grid-like structure, then the reflection principle can be applied only when despite the structure of the web sufficient light is reflected. A light-absorbing e.g. matte black or dar web cannot be scanned according to the reflection principle, it then is necessary to operate according to the light barrier principle, under which the web interrupts the light ray of the light source, as is determined by the appropriate receiving element. The light barrier principle can however not be applied when the web has a grid or net-type structure because no definitive edge can be determined. Also, the light barrier principle does not operate satisfactorily when the edge is frayed. In this case, as long as the web is a reflecting one, the operation must use the reflection principle.

OBJECT OF THE INVENTION

The object of the invention is to improve a photoelectric scanning device of the type mentioned above to such an extent that with it every type of goods of any color or quality can be scanned and its edge position determined.

SUMMARY OF THE INVENTION

This object is attained in accordance with the invention when for the light source, two receiving elements are provided, capable of being selectively activated, of which a first receiving element cooperates with the light source according to the reflection principle, and the second receiving element according to the light barrier principle.

In this implementation in every case one of the two receiving elements is utilized, which ten cooperates with the light source either according to the reflection principle or the light barrier principle, depending on what type of web or web quality is to be operated on.

The impulses emanating from the receiving element are then the same, whether the light ray is reflected by the web, or interrupted by the light barrier.

Accordingly, there will be no reaction if no reflection occurs, or the light passes the light barrier and arrives at the receiving element. The conditions of construction are such that there need not be any extensive adjustment proceedings, but that the light source will always cooperate with the receiving elements in such manner that the edge of the web will be scanned in exactly the same place independent of the principle instantaneously in use.

If there is a light-absorbing web with a dense surface, then the receiving element for the light barrier principle is activated. If, however, there is a reflecting web, then operation is carried out with the other receiving element according to the reflection principle, where nevertheless the other principle can be made to respond at all times.

This arrangement and simultaneous readiness of both principles has a great advantage for a web of net or gridlike structure, where the light is partly reflected and subsequently absorbed, so that here one operates under the light barrier and the reflection principle. Easy access to the components of the scanning device is given in fully sufficient manner. A compact construction can also be achieved. It is possible to use the same external elements as in an existing scanning device, so that the retrofitting of a previously operative scanning device can be accomplished without extensive measures.

According to the invention the two receiving elements are arrayed in the first tubular housing together with the light source, and a reflecting surface on the second tubular housing is coordinated with the receiving element operating according to the light barrier principle.

Here the light source and the two receiving elements are contained in one and the same tubular housing. The other tubular housing serves only the purpose of reflecting the light ray of the light source to the second receiving element under the light barrier principle, and beyond that it can be made hollow. This housing section then serves as a support for the purpose of security when the web sags.

The second receiving element is oriented towards the light source and is emplaced in the second tubular housing.

Alternatively, Here, the second tubular housing is provided for security purposes against excessive sag of the web and is also designed for the reception of the second receiving element which then cooperates with the light source according to the light barrier principle.

An arrangement which is particularly sensitive has the light source formed by transmitting light-emitting diodes placed in a row on a ladder plate lengthwise in the first tubular housing. In the second tubular housing coordinate receiving photo diodes are provided in a like array on a ladder place. Ahead of the transmitting light-emitting diodes and the receiving photo diodes respective lenses are attached to the tubular housing.

Because the light sources and receiving elements are arranged in rows, the edge of the goods is sensed continuously and the pulses thus generated cause the web to be brought into the desired position. In this implementation a net web as well as a reflecting tight weave can be guided accurately, because the edge of the goods can always be sensed.

Advantageously the light source has its exit direction Q inclined with respect to a plane perpendicular to the web at an angle of approximately 55°, and the first receiving element has its entrance direction at an angle of approximately 15°, both on the same side of the perpendicular plane.

With the angles indicated, an especially compact implementation of the sensing device is attained, because the light source and the receiving elements are close together. It is particularly important that at these angles, influences of stray light, unwanted reflected light and refractions are eliminated from the start. When applying the reflection principle the first receiving element cooperates very precisely with the light source. Under the light barrier principle, it is no problem to attain precise sensing of the edge area even when the light source with its exit angle lies in the angle indicated.

I can eliminate the influence of external light, stray light or reflected light by providing in a support body of the tubular housing pipe-like channels for the light source and the receiving element, and covering them with a glass plate. The channels of the light source and of the first receiving element run into a common cavity of the support body covered by the glass plate. The first receiving element is screened with respect to stray or refracted light from the glass plate due to the light source by the channel entry edge. The web thereby slides directly over the glass surface and keeps the pane free of dust. Due to the contact with the glass pane the web is precisely in the area of reflection and the path of the rays reaches the receiving element securely.

The surfaces of the channels of the cavity and in given cases of the area opposite to the reflecting receiving element on the second tubular housing are blackened, coated or constructed in a light-reflection reducing manner. Otherwise there is a danger that in the channels of the cavity additional reflections could occur, which could influence scanning sensitivity.

The reflecting surface for the second receiving element in the first tubular housing can be arranged opposite the exit direction of the light source and skewed with respect to the axis of the second tubular housing. With this inclination of the reflecting surface the second receiving element can be moved as close as possible to the light source and the first receiving element, which is favorable for the compact construction of the sensing apparatus.

Due to the compact construction, and to the fact that the web is guided in very close proximity to the receiving elements, there is the danger that the sensing apparatus will become unsuitably hot. Infrared light does not exhibit this negative side effect and is preferably used.

Some space is given up in this embodiment, but in one embodiment the light source and the receiving elements lie one behind the other in the longitudinal direction of support body in the tubular housing. The scanning area can be made comparatively wide.

Alternatively the light source and the first receiving element in the support body of the first tubular housing lie one behind the other in the direction of the web motion, and the exit direction of the light source is skewed with respect to the entrance direction (E I) of the first receiving element, preferably including an angle of about 40°. Here, with a narrower sensing area an exceptionally compact construction is attained, since the first receiving element lies immediately next to the light source, so that the second receiving element can be moved very close to the light source.

BRIEF DESCRIPTION OF THE DRAWING

In the drawing:

FIG. 1 is a cross section through a photo-electric sensing device of the invention;

FIGS. 2 and 3 are sections through another embodiment; and

FIGS. 4 and 5 show a further embodiment of the scanning device in longitudinal and transverse cross section, respectively.

SPECIFIC DESCRIPTION

From FIG. 1 shows a photo-electric scanning device which consists of the first tubular housing element 2 and a second tubular housing element 3 parallel thereto and emplaced thereunder; the housing elements are connected with one another by a holding flange 4 and held in place by an attachment element 5, by means of which the sensing device can be placed upon a web handling device, not shown, that the web designated by 8 runs between the two tubular housings 2 and 3 in such manner that its edge can be scanned.

In tubular housing 2 a rod-shaped support body 6 is provided, upon which the tubular housing 2 can be releasably plugged and fixed in a loosenable manner for easy disassembly. For this purpose, tubular housing 2 is divided transversely. Its section shown in FIG. 2 can be pulled off support body 6, so that subsequently the front end of support body 6 is freely accessible. In support body 6 a socket 9 is provided which is extended by a channel 10 running into cavity 18 opens towards the bottom. Immediately adjacent to the socket 9 and the channel 10 a socket 11 is provided and has a coaxial channel 12 which likewise runs unto cavity 18. Furthermore, at a distance from socket 11 a third socket 13 is provided which is extended by a channel 14, which runs into the underside of support body 6.

In the socket 9 is a light source, preferably an infrared light 15, inserted in such manner that its direction of light exit designated Q includes an angle of about 55° with a plane perpendicular to the web. Into socket 11 is inserted a first receiving element 16, e.g. a photodiode, which protrudes into channel 12 and has an entry opening E I which is inclined towards the plane perpendicular to the web at an angle of 15°, and indeed towards the same side as the exit direction Q.

Into socket 13 a second receiving element 17 is inserted which protrudes into channel 14 and has an entrance direction E II, which is inclined at an angle towards the plane perpendicular upon the web, but towards the other side. The channel 12 forms, together with the wall of cavity 18, an entry edge 19, which screens the first receiving element 16 against reflected light or stray light from light source 15. Suitably, the surfaces 20 of the cavity 18 and of the channels are blackened or made light absorbing.

The tubular housing 2 has on its underside a cavity which is covered by a glass pane 21. The position of entry edge 19 is so chosen that light from light source 15 exiting from channel 10 cannot affect the first receiving element 16 via reflection or refraction by glass pane 21. The glass pane 21 extends also beyond the entry of channel 14 of the second receiving element 17. The exit direction Q intersects the entry direction E I of the first receiving element 16 at a point X which corresponds to the nominal position of the edge of web 8. The light source 15 cooperates with the first receiving element 16 according to the reflection principle, i.e. light from light source 15 reflected by the web is sensed by receiving element 16 and reported to a circuitry not shown. The edge of the web in FIG. 1 lies to the right of point X as long as light is reflected by the web. As soon as the edge runs to the left beyond point X, no light is reflected by the web, which the first receiving element 16 determines, and reports to the circuitry. Subsequently, suitable signals are generated so that the run of the web can be corrected. This occurs only if the web has a reflecting surface. If however the web 8 has a light-absorbing surface, then the light source 15 cooperates with the second receiving element 17 in such manner that the light exiting in exit direction Q arrives at a reflecting surface (22) which is arranged skewed on the second tubular housing 3. The entrance direction E II of the second receiving element 17 is oriented towards the reflecting surface 22, so that again point X is scanned. If the edge of the web 8 runs to the right of point X, then the light barrier between the light source and the second receiving element 17 is interrupted, which is reported to the circuitry. If however the edge runs to the left of point X, then the light barrier is open, which is likewise utilized for the generation of a signal. The receiving elements 16, 17 are in continuous readiness, so that upon insertion of the web one need not deliberate which system is applicable to the goods.

In a further embodiment the second receiving element 17 is not contained in the support body 6 of the first tubular housing 2, but in a support body 7 which is located in the second tubular body 3 and contains the socket 13' and the channel 14', where the second receiving element 17, in socket 13' and channel 14', is oriented directly towards light source 15, with the entrance direction E II' Channel 14' is then covered by a glass pane 23', which replaces reflecting surface 22.

In the embodiment according to FIGS. 2 and 3, the light source 15 and the first receiving element 16 are arrayed one behind the other in the direction of web motion. The socket 9 with channel 10 is angled with respect to socket 11 and channel 12 at an angle of about 40°, and as shown by FIG. 3, under an angle of about 20° with respect to a plane perpendicular to the web. In the cavity opening downwards an entry edge 25 is again defined by channel 12, which keeps reflected and refracted light from the glass pane away from the first receiving element 16.

The exit direction Q intersects entrance direction E I of the first receiving element 16 in point X. The light source 15 again cooperates with the first receiving element 16 according to the reflection principle, i.e. by the reflecting web the light from light source 15 is thrown back to receiving element 16. If the edge of the web leaves point X then no more light is reflected onto the first receiving element, which the latter reports to the circuitry not shown. In this embodiment the second receiving element 17 (FIG. 3) can be moved close to the light source 15 and the first receiving element 16. The second receiving element 17 is again located in the socket 13 and the channel 14, which suitably opens into the same cavity 24 as channels 10 and 12. The second receiving element 17 cooperates with the light source 15 according to the light barrier principle, i.e. in that a light absorbing web either permits or interrupts the light transmission from light source 15 to receiving element 17, which is reported accordingly to the circuitry.

The receiving elements 16, 17 are continuously activated, and they produce an equal signal when the reflecting receiver 16 receives light and/or the second receiving element receives no light, and vice versa, i.e. when the web 8 with its edge lies to the right of point X, the second receiving element 17 receives no light under the light barrier principle and the ray is reflected upon the first receiving element according to the material. When however the web 8 with its edge lies to the left of point X, then no reflection occurs, and the second receiving element receives the light ray. Both the lacking reflection and the light ray of the light barrier cause the same control pulse.

The light source 15 is suitably an infrared light source in order to avoid undesirable heat rise, which due to the compact design of the scanning device would hardly be avoidable if normal light sources were used.

The circuitry not shown is suitably outside the scanning device and is connected via suitable wiring, which runs from support element 5 through channels in support bodies 6 and 7, with the light source and the receiving elements.

The advantage of the scanning device lies in the fact that any type of goods can be scanned reliably, without the user having to deliberate whether the light barrier or the reflection principle will generate the correct control and respond to the material. At a changeover from one operating principle to the other operating principle, no adjustment needs to be carried out, since the various components of the scanning device are always constantly activated and attuned to one another, indpendently of the operating principle under which they work.

In the embodiment according to FIG. 4, the light source 15 is formed by transmitting light-emitting diodes arrayed next to one another on a ladder plate 27, which is slid into tubular housing 2 and fastened (there). In the opposite tubular housing 3 a ladder plate 28 is provided, upon which receiver photodiodes 17 are fastened, coordinated with and oriented towards transmitting light-emitting diodes 15. The tubular housings 2, 3 exhibit on their surface apertures 32 for the entrance and exit of the light rays 31 from the transmitting elements 15 to the receiving elements 16, 17, which (apertures) are each covered by a cylindrical lens 29, 30. The light ray 31 is bundled by the cylindrical lens 29, 30, and guided parallel to the receiving element 16, 17, so that a scattering of the light and thus inaccurate results are avoided. In FIG. 5 is shown a cross section through housing 2,3, with the arrangement of the cylindrical lenses 29, 30, and the transmitting elements 15 and receiving elements 16, 17.

I claim:

1. A photoelectric sensor for a moving web of material, comprising:
    an upper and a lower housing disposed on opposite sides of a plane of said web and straddling a location at which an edge of said web is to be positioned as said web is moved along a path between said housings;
    a light source in a first of said housings directing a light ray along an optical axis of said source onto said path at an inclination to said plane of said web so that said ray is selectively reflected and intercepted iin dependence upon the material of said web;
    a first light detector in said first of said housings having an optical axis inclined to said plane of said web and positioned on the same side as said source of another plane perpendicular to the plane of said web at said location for receiving the light ray upon reflection from said web, said optical axis of said source and said first detector lying in a plane substantially perpendicular to said other plane;

a cover permeable to said light ray on said first of said housings extending over said source and said first detector; and a second light detector on one of said housings positioned on an opposite side of said other plane and to receive said light ray from said source when the same is not reflected or intercepted by said web.

2. The photoelectric sensor defined in claim 1 wherein said optical axis of said light source includes an angle with said other plane of substantially 55° and said axis of said first light detector includes an angle of substantially 15° with said other plane.

3. The photoelectric sensor defined in claim 1 wherein said cover is a glass pane covering respective channels formed in said first of said housings and respectively receiving said light source and said first light detector, an edge of one of said channels blocking stray and refracted light from said glass pane from affecting said first light detector.

4. The photoelectric sensor defined in claim 3 wherein said first of said housings is provided with a recess into which said channels open, said channels and said recess being provided with reflection-reducing surfaces.

5. The photoelectric sensor defined in claim 1 wherein said second light detector is provided in the second of said housings.

6. The photoelectric sensor defined in claim 1 wherein said second light detector is provided in said first of said housings and the second of said housings has a reflective coating for reflecting said light ray from said source to said second light detector.

7. The photoelectric sensor defined in claim 1 wherein said light source includes an array of light-emitting diodes on a ladder support and at least one of said light detectors includes an array of photodiodes on a respective ladder support, respective cylindrical lenses being provided in the path of light rays from said light-emitting diode and to said photodiode.

8. The photodiode sensor defined in claim 1 wherein said axes of said light source and said first light detector include an angle of substantially 40° with one another.

* * * * *